(12) United States Patent
Ishida

(10) Patent No.: US 7,963,212 B2
(45) Date of Patent: Jun. 21, 2011

(54) COMBINATION OF A PISTON AND A PISTON RING

(75) Inventor: Masao Ishida, Suwa (JP)

(73) Assignee: Teikoku Piston Ring Co., Ltd., Tokyo (JP)

( * ) Notice: Subject to any disclaimer, the term of this patent is extended or adjusted under 35 U.S.C. 154(b) by 529 days.

(21) Appl. No.: 12/172,506

(22) Filed: Jul. 14, 2008

(65) Prior Publication Data

US 2009/0020006 A1    Jan. 22, 2009

(30) Foreign Application Priority Data

Jul. 19, 2007    (JP) ................................. 2007-187786

(51) Int. Cl.
*F16J 9/06* (2006.01)
*E02F 3/00* (2006.01)
(52) U.S. Cl. ................ 92/193; 92/159; 92/212
(58) Field of Classification Search ............. 92/158, 92/159, 182, 193, 212; 277/434
See application file for complete search history.

(56) References Cited

U.S. PATENT DOCUMENTS

| 5,598,763 A | * | 2/1997 | Rao et al. | ............... 92/212 |
| 5,655,433 A | * | 8/1997 | Santi | ............... 92/208 |
| 5,737,999 A | * | 4/1998 | Ariga | ............... 92/158 |
| 6,675,762 B2 | * | 1/2004 | Han | ............... 123/193.6 |
| 2003/0079709 A1 | | 5/2003 | Han | ............... 123/193.6 |

FOREIGN PATENT DOCUMENTS

| JP | 47-20653 | | 6/1972 |
| JP | 4-78375 | | 3/1992 |
| JP | 04-078375 | | 3/1992 |
| JP | 04078375 A | * | 3/1992 |
| JP | 05-280417 | | 10/1993 |
| JP | 09-196172 | | 7/1997 |
| JP | 11-236853 | | 8/1999 |

OTHER PUBLICATIONS

European Search Report dated Sep. 22, 2009.

* cited by examiner

*Primary Examiner* — Thomas E Lazo
(74) *Attorney, Agent, or Firm* — a Kratz, Quintos & Hanson, LLP

(57) ABSTRACT

A piston 1 contains multiple ring grooves 2, 3 on the outer circumference of the piston 1, and piston rings 4, 10 are mounted in the ring grooves 2, 3. The piston 1 contains oil path grooves 7, 9 extending respectively to the outer circumference of the piston 1 on the upper and lower surfaces of the lowermost ring groove 2, and an oil path groove 12 extending to the outer circumference of the piston 1 on the lower surface of the ring groove 3 just above the lowermost ring groove 2. The weight of the lowermost piston ring 4 is equal to or smaller than the weight of the piston ring 10 just above the lowermost piston ring 4; and expanders 5, 11 are installed on the rear side of the piston rings 4, 10 respectively.

20 Claims, 4 Drawing Sheets

COMBINATION OF A PISTON AND A PISTON RING

BACKGROUND OF THE INVENTION

1. Field of the Invention

The present invention relates to a combination of a piston and a piston ring for automotive engines.

2. Description of the Related Art

Demands for high output as well as low exhaust gas emissions and low fuel consumption in automobile engines have led to demands for piston rings with better gas sealing and oil control functions as well as low friction. Progress is underway to lower friction by making the oil ring thinner to improve conformability characteristics and also by lowering the tension. Oil rings are mainly a three-piece type combined oil ring with separated upper and lower rails; and a two-piece type combined oil ring where the upper and lower rails are connected by a web into one piece. In both of these combined oil rings, an expander presses the rail section against the inner wall of the cylinder bore, and that surface pressure acts to control the oil film by scraping off oil on the cylinder bore.

The two-piece type combined oil ring with a coil expander on the rear side has a low spring constant and also little reduced tension from wear, and the initial tension of the ring where the reduced tension is estimated can be set to a small level. Therefore, the two-piece type combined oil ring is effective for reducing friction.

However, in the conventional two-piece type combined oil ring, the oil ring usually includes two rails as well as oil holes between the rails, so that making thinner dimensions results in small oil holes, causing the problems that along with narrower oil passages, machining the holes becomes difficult. The improvement in conformability by the thinner width dimensions was therefore limited.

Technology is disclosed in Japanese patent non-examined publication No. 04-078375 for an oil ring without oil holes penetrating along the radial direction between the two rails of the oil ring; and formed with a groove extending along the radial direction to an extent not penetrating through the piston on the lower surface of the ring groove of the piston where the oil ring is mounted. Since there is no oil holes, the ring side surfaces have better precision, the ring is strong when the width is thinned, and a reverse flow of oil from the oil holes is prevented. Moreover, the groove is formed to extend along the radial direction to an extent not penetrating through the piston on the lower surface of the ring groove so that pressure is reduced on the rear side of the oil ring, and along with reducing outer circumferential wear on the oil ring, carbon sludge deposits are prevented.

Technology is disclosed in Japanese patent non-examined publication No. 11-236853 for a piston formed with a step section on the piston land section between the oil ring and the second ring, and formed with oil return holes connecting the step section and the piston internal space, and the second ring is a resin ring without a gap. Using a resin ring without a gap reduces blow-by gases, and the step section and the oil return hole return surplus oil to the crankcase so that oil consumption is reduced.

Technology is disclosed in Japanese patent non-examined publication No. 09-196172 for a piston including an oil return passage on the lower surface of the ring groove, and a combined oil ring including one rail protruding on the outer circumferential center section of the oil ring and with no oil return holes in the oil ring. This technology suppresses oil scraping effect during the upward piston stroke, and increases the oil scraping effect during the downward piston stroke, so that oil consumption is reduced.

Technology is disclosed in Japanese patent non-examined publication No. 05-280417 for a piston structure formed with a notch formed in the second land section and opening on the upper and lower grooves. The notch is formed in sections along the periphery and so sufficient space between the cylinder wall and the second land section is ensured while maintaining the oil ring position, and proper oil scrape-off performance by the oil ring is maintained, so that oil consumption is reduced.

Technology is disclosed in Japanese patent publication No. 47-020653 for a piston ring where along with closing an inner circumferential surface of a ring-shaped piece having a U-shaped cross sectional oil passage and both ends facing a gap, a connection hole is formed on the bottom plate for connecting an oil return hole formed on the piston. This structure effectively renders both an oil ring scrape off function and a gas leak prevention function.

However, when the oil ring disclosed in Japanese patent non-examined publication No. 04-078375 is made to thinner dimensions, the space between the rails becomes narrower, and sufficient space to allow oil scraped off by the upper rail to escape cannot be obtained because there is no oil holes. An increase in the oil pressure will therefore cause the problem of a reverse flow of oil upwards. The technology in Japanese patent non-examined publication No. 11-236853 utilizes a second ring with two rails and an oil ring with two rails and so is impossible to make thinner. The technologies disclosed in Japanese patent non-examined publication No. 09-196172, Japanese patent non-examined publication No. 05-280417, and Japanese patent publication No. 47-020653 do not disclose a structure for an oil path groove formed on the upper and lower surfaces of the lowermost ring groove of the piston and extending to the outer circumference of the piston, and an oil path groove formed on the lower surface of the ring groove just above the lowermost ring groove and extending to the outer circumference of the piston.

SUMMARY OF THE INVENTION

An object of the present invention is to provide a combination of a piston and a piston ring capable of making a piston ring thinner and reducing oil consumption.

To resolve the above problems, the present invention employs the following aspects.

Namely, a combination of a piston and a piston ring comprises a piston including multiple ring grooves on an outer circumference of the piston, and piston rings mounted in the ring grooves, wherein the piston contains oil path grooves extending respectively to the outer circumference of the piston on upper and lower surfaces of the lowermost ring groove, and an oil path groove extending to the outer circumference of the piston on a lower surface of the ring groove just above the lowermost ring groove; the weight of the lowermost piston ring is equal to or smaller than the weight of the piston ring just above the lowermost piston ring; and an expander is installed on the rear side of each of the piston rings.

An axial oil path groove to connect the oil path grooves formed on both the ring grooves is preferably formed on an outer circumference of a land section between the lowermost ring groove of the piston and the ring groove just above the lowermost ring groove. The cross sectional area of the axial oil path groove is preferably smaller on the ring groove side just above the lowermost ring groove than on the lowermost ring groove side.

The oil path groove formed on the upper surface of the lowermost ring groove, and the oil path groove formed on the lower surface of the ring groove just above the lowermost ring groove may connect with an internal space of the piston, but preferably do not connect with an internal space of the piston.

The following aspect may be employed.

Namely, a combination of a piston and a piston ring comprises a piston including multiple ring grooves on an outer circumference of the piston, and piston rings mounted in the ring grooves, wherein the piston contains an oil path groove to connect both the ring grooves and extending to the outer circumference of the piston on a land section between the lowermost ring groove and the ring groove just above the lowermost ring groove, and an oil path groove extending to the outer circumference of the piston on a lower surface of the lowermost ring groove; the weight of the lowermost piston ring is equal to or smaller than the weight of the piston ring just above the lowermost piston ring; and an expander is installed on the rear side of each of the piston rings.

In this case also, the oil path groove to connect both the ring grooves may connect with an internal space of the piston, but preferably does not connect with an internal space of the piston.

The oil path groove formed on the lower surface of the lowermost ring groove does not connect with an internal space of the piston or connects with an internal space of the piston.

In the above combination of a piston and a piston ring, an axial clearance between the upper surface of the lowermost ring groove and the upper surface of the lowermost piston ring within the lowermost ring groove is preferably larger than an axial clearance between the upper surface of the ring groove just above the lowermost ring groove and the upper surface of the piston ring within the ring groove just above the lowermost ring groove.

The piston ring preferably contains one circular protrusion across the entire outer circumference of the piston ring.

The surface of the outer circumference of the piston ring that slides on a cylinder is preferably formed as a flat surface or a tapered surface.

Gap positions of the lowermost piston ring and the piston ring just above the lowermost piston ring are preferably shifted 90 degrees or more along the periphery and a structure for preventing both the rings from rotating is preferably provided.

The expander is preferably a plate spring containing multiple humps positioned at intervals along the periphery, an axial corrugated expander, a radial corrugated expander, or a coil expander.

The present invention is capable of preventing an upward flow of oil, and reducing oil consumption since the oil path grooves function to prevent a rise in oil pressure. There is further no need to form oil return holes and the piston ring can be made thinner so that there is improved conformability on the cylinder wall to improve the oil scrape off function so that oil consumption can be reduced. Also, the weight of the lowermost piston ring is equal to or smaller than the weight of the piston ring just above the lowermost piston ring so that the piston ring just above the lowermost piston ring seats more easily on the lower surface of the ring groove while the piston is lowered when the piston rings are moving up and down within the ring grooves due to the inertial force such as when operating the engine under no-load conditions. The upward leakage of oil on the piston land section between both the ring grooves can be therefore prevented, and oil can return to the crankcase by way of the oil path groove formed on the upper surface of the lowermost ring groove, the space on the rear side of the lowermost piston ring, and the oil path groove formed on the lower surface of the lowermost ring groove so that oil consumption can be reduced.

DETAILED DESCRIPTION OF THE PREFERRED EMBODIMENTS

Figure 1:
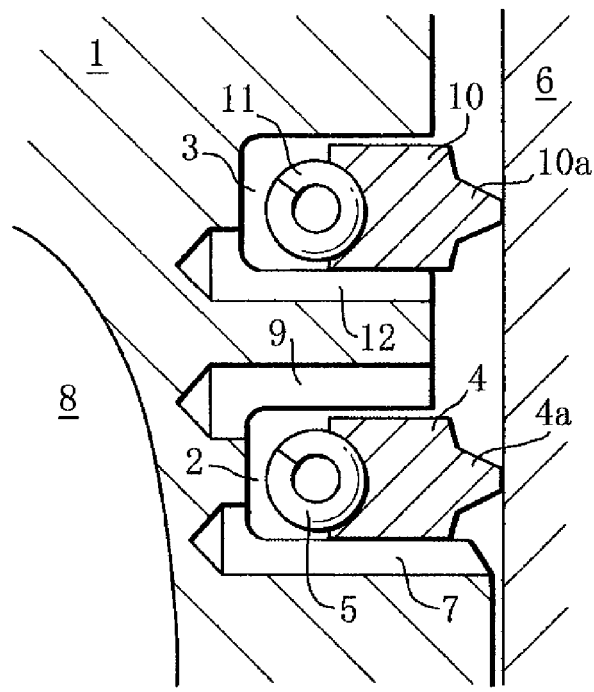
FIG. 1 is a longitudinal cross sectional view showing an embodiment of the present invention.

An embodiment of the present invention is described next while referring to FIG. 1.

A piston 1 contains multiple ring grooves on the outer circumference of the piston 1. FIG. 1 shows a lowermost ring groove 2 and a ring groove 3 just above the lowermost ring groove 2. Though not shown in FIG. 1, one or more ring grooves such as second ring groove and top ring groove are formed above these ring grooves 2 and 3 on the outer circumference of the piston 1. Piston rings are mounted in these ring grooves.

A piston ring 4 is mounted in the lowermost ring groove 2 of the piston 1. A coil expander 5 for pressing the piston ring 4 outwards along the radial direction is installed on the rear side of the piston ring 4. This piston ring 4 has a roughly rectangular cross section, and includes one circular protrusion 4a protruding across the entire outer circumference at the center section in the axial direction, and an arc-shaped inner-circumferential groove for contacting the coil expander 5 on the inner circumference. The circular protrusion 4a has a cross sectional shape whose width in the axial direction narrows towards the tip, and the tip surface that slides on a cylinder 6 is formed as a flat surface.

Multiple oil path grooves 7 extending along the radial direction are formed at equidistant spaces along the periphery on the lower surface of the lowermost ring groove 2. On the outer circumferential side, the oil path groove 7 extends to the outer circumference of the piston 1 and opens facing the space between the cylinder 6 and the piston 1. On the inner circumferential side, the oil path groove 7 extends inwards further than the ring groove bottom without penetrating to the internal space 8 of the piston 1, and forms a hole shape beyond the ring groove. Identical oil path grooves 9 are also formed on the upper surface of the lowermost ring groove 2. In other words, on the outer circumferential side, the oil path groove 9 extends to the outer circumference of the piston 1 and opens facing the space between the cylinder 6 and the piston 1. On the inner circumferential side, the oil path groove 9 extends inwards further than the ring groove bottom without penetrating to the internal space 8 of the piston 1, and forms a hole shape beyond the ring groove. These oil path grooves 7, 9 may be grooves as cast or formed by drilling.

A piston ring 10 is mounted in the ring groove 3 just above the lowermost ring groove 2. A coil expander 11 for pressing the piston ring 10 outwards in the radial direction is installed on the rear side of the piston ring 10. This piston ring 10 has a roughly rectangular cross section, and includes one circular protrusion 10a protruding across the entire outer circumference at the center section in the axial direction, and an arc-shaped inner-circumferential groove for contacting the coil expander 11 on the inner circumference. The circular protrusion 10a has a cross sectional shape whose width in the axial direction narrows towards the tip, and the tip surface that slides on the cylinder 6 is formed as a flat surface.

Multiple oil path grooves 12 extending along the radial direction are formed at equidistant spaces along the periphery on the lower surface of the ring groove 3 just above the lowermost ring groove 2. On the outer circumferential side, the oil path groove 12 extends to the outer circumference of the piston 1 and opens facing the space between the cylinder 6 and the piston 1. On the inner circumferential side, the oil path groove 12 extends inwards further than the ring groove bottom without penetrating to the internal space 8 of the piston 1, and forms a hole shape beyond the ring groove.

Thus, the oil scraped from the wall surface of the cylinder 6 by the lowermost piston ring 4 is returned to the crankcase by way of the space between the outer circumference of the piston 1 and the inner wall of the cylinder 6. Also, the oil scraped from the wall surface of the cylinder 6 by the piston ring 10 just above the lowermost piston ring 4, is returned to the crankcase by way of the gap of the lowermost piston ring 4, and the oil path groove 9 formed on the upper surface of the lowermost ring groove 2, the space on the rear side of the lowermost piston ring 4, and the oil path groove 7 formed on the lower surface of the lowermost ring groove 2, and further the space between the outer circumference of the piston 1 and the inner wall of the cylinder 6. In this case, the oil path grooves 7, 9 formed on the lowermost ring groove 2, and the oil path groove 12 of the ring groove 3 just above the lowermost ring groove 2 act to prevent a rise in oil pressure so that an upward flow of oil can be prevented and oil consumption reduced. Moreover, the oil path groove 9 formed on the upper surface of the lowermost ring groove 2, and the oil path groove 12 formed on the lower surface of the ring groove 3 just above the lowermost ring groove 2, do not penetrate to the internal space 8 of the piston 1 so that there is no flow of oil from the internal space 8 of the piston 1 via the oil path grooves 9, 12 to the outer circumferential side of the piston and an increase in oil consumption can be therefore prevented.

The lowermost piston ring 4 and the piston ring 10 just above the lowermost piston ring 4 include one circular protrusion 4a, 10a on the outer circumference respectively, allowing a high surface pressure on the piston rings 4, 10 that lowers the oil consumption. An increase in oil pressure can also be prevented and oil consumption reduced. Moreover, the lowermost piston ring 4 and the piston ring 10 just above the lowermost piston ring 4 can be made thinner so that conformability on the wall surface of the cylinder 6 of each of the piston rings 4, 10 can be improved, the oil scrape-off function improved, and oil consumption reduced.

The weight of the lowermost piston ring 4 is equal to or smaller than the weight of the piston ring 10 just above the lowermost piston ring 4. Utilizing this type of structure allows the piston ring 10 just above the lowermost piston ring 4 to seat more easily on the lower surface of the ring groove 3 while the piston 1 is lowered when the piston rings 4, 10 are moving up and down within the ring grooves 2, 3 due to the inertial force such as when operating the engine under no-load conditions. The upward leakage of oil on the piston land section between both the ring grooves 2, 3 can be therefore prevented, and oil can return to the crankcase by way of the oil path groove 9 formed on the upper surface of the lowermost ring groove 2, the space on the rear side of the lowermost piston ring 4, as well as the oil path groove 7 formed on the lower surface of the lowermost ring groove 2, so that oil consumption can be reduced.

The gap positions of the lowermost piston ring 4 and the piston ring 10 just above the lowermost piston ring 4 are preferably shifted 90 degrees or more along the periphery. Moreover, a structure for preventing both the piston rings 4, 10 from rotating is preferably provided. This type of structure delays the rise of oil from the gap so that oil consumption can be reduced during changes in speed during engine operation.

Figure 2:
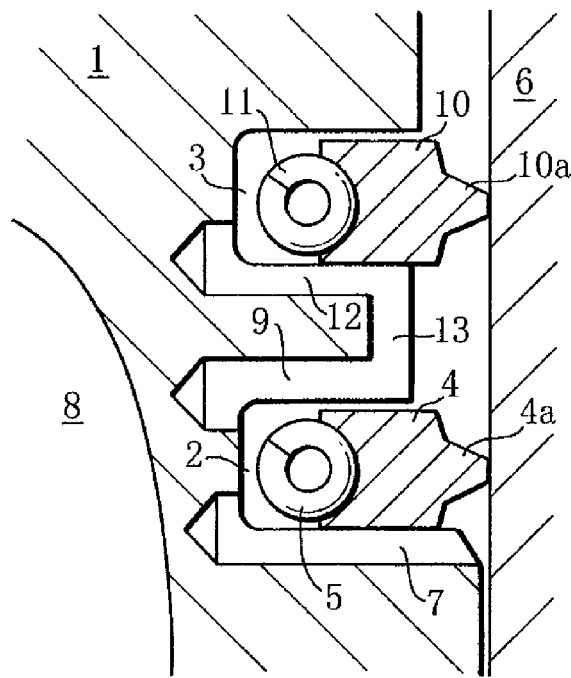
FIG. 2 is a longitudinal cross sectional view showing another embodiment of the present invention.

FIG. 2 is a drawing showing another embodiment of the present invention. In this embodiment, multiple axial oil path grooves 13 to connect the oil path grooves 9, 12 formed on both the ring grooves 2, 3 are formed at equidistant spaces along the periphery, on the outer circumference of the land section between the lowermost ring groove 2 of the piston 1 and the ring groove 3 just above the lowermost ring groove 2. All other sections of the structure are identical to the above embodiment.

By utilizing the above structure, the piston ring 10 just above the lowermost piston ring 4 can prevent a further rise in oil pressure of oil scraped from the wall surface of the cylinder 6, and along with improving the oil return to the crankcase side, can reduce the oil consumption even further.

Figure 3:
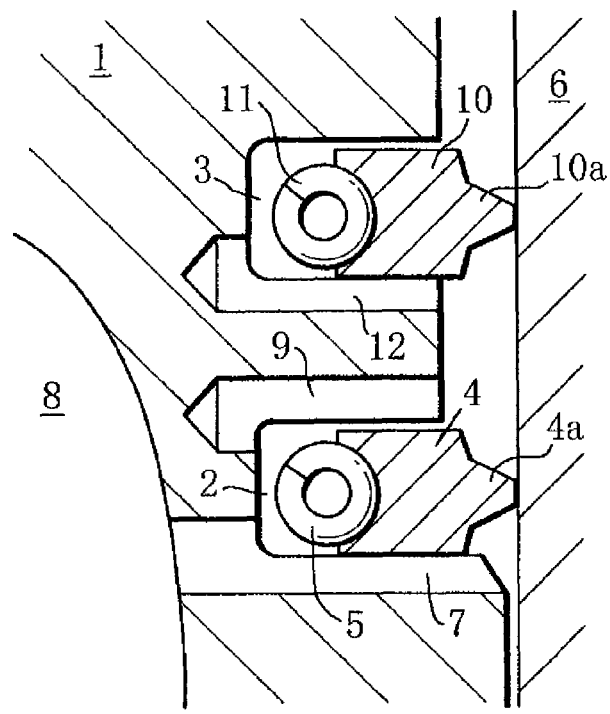
FIG. 3 is a longitudinal cross sectional view showing yet another embodiment of the present invention.

FIG. 3 is a drawing showing yet another embodiment of the present invention. In this embodiment, the oil path groove 7 formed on the lower surface of the lowermost ring groove 2, penetrates to the internal space 8 of the piston 1 in order to connect with the internal space 8 of the piston 1. All other sections of the structure are identical to the above embodiment.

Utilizing the above structure can improve the return of oil scraped by the lowermost piston ring 4 from the wall surface of the cylinder 6, to the crankcase side.

Figure 4:
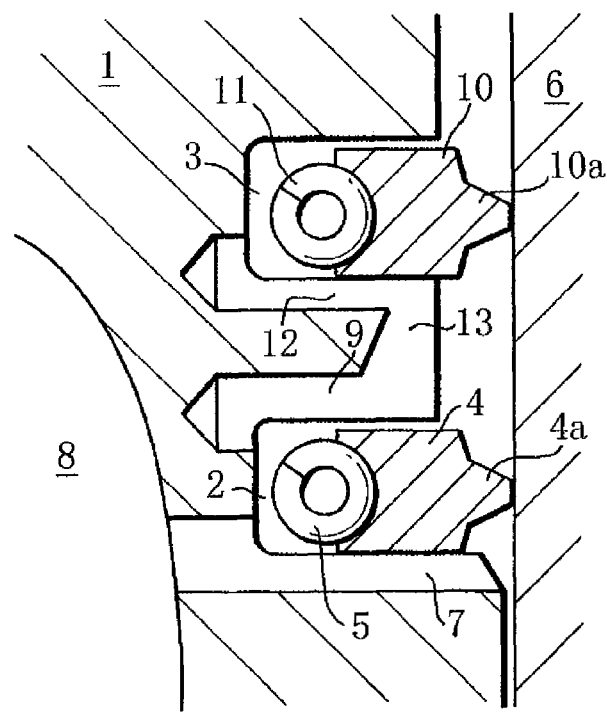
FIG. 4 is a longitudinal cross sectional view showing yet another embodiment of the present invention.

FIG. 4 is a drawing showing still another embodiment of the present invention. In this embodiment, multiple axial oil path grooves 13 to connect the oil path grooves 9, 12 formed on both the ring grooves 2, 3 are formed at equidistant spaces along the periphery, on the outer circumference of the land section between the lowermost ring groove 2 of the piston 1 and the ring groove 3 just above the lowermost ring groove 2. The cross sectional area of the axial oil path groove 13 is smaller on the ring groove 3 side just above the lowermost ring groove 2 than on the lowermost ring groove 2 side, and the oil path groove 7 formed on the lower surface of the lowermost ring groove 2, penetrates to the internal space 8 of the piston 1 in order to connect with the internal space 8 of the piston 1. All other sections of the structure are identical to the above embodiment.

The above structure for the cross sectional area of the axial oil path groove 13 serves to improve the return of oil scraped by the piston ring 10 just above the lowermost piston ring 4, from the wall surface of the cylinder 6, to the crankcase side, so that oil consumption can be improved even further.

Figure 5:
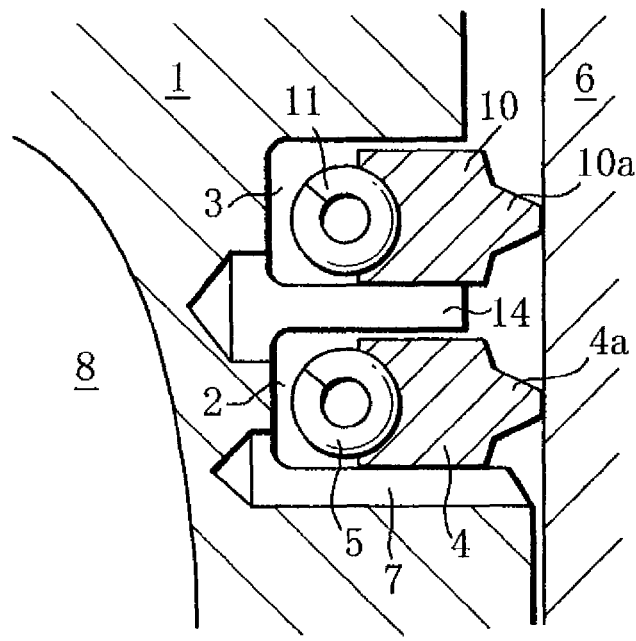
FIG. 5 is a longitudinal cross sectional view showing yet another embodiment of the present invention.

FIG. 5 is a drawing showing still another embodiment of the present invention. In this embodiment, instead of forming the oil path grooves 9, 12 formed on the upper surface of the lowermost ring groove 2 and the lower surface of the ring groove 3 just above the lowermost ring groove 2 in the previous embodiment, here multiple oil path grooves 14 to connect both the ring grooves 2, 3 and extending along the radial direction are formed on the land section between the lowermost ring groove 2 of the piston 1 and the ring groove 3 just above the lowermost ring groove 2. All other sections of the structure are identical to the above embodiment. The oil path grooves 14 are formed at equidistant spaces along the periphery of the piston 1. On the outer circumferential side, the oil path groove 14 extends to the outer circumference of the piston 1 and opens facing the space between the cylinder 6 and the piston 1. On the inner circumferential side, the oil path groove 14 extends inwards further than the ring groove bottom without penetrating to the internal space 8 of the piston 1, and forms a hole shape beyond the ring groove.

Utilizing the above described structure allows reducing the axial length of the piston 1.

Figure 6:
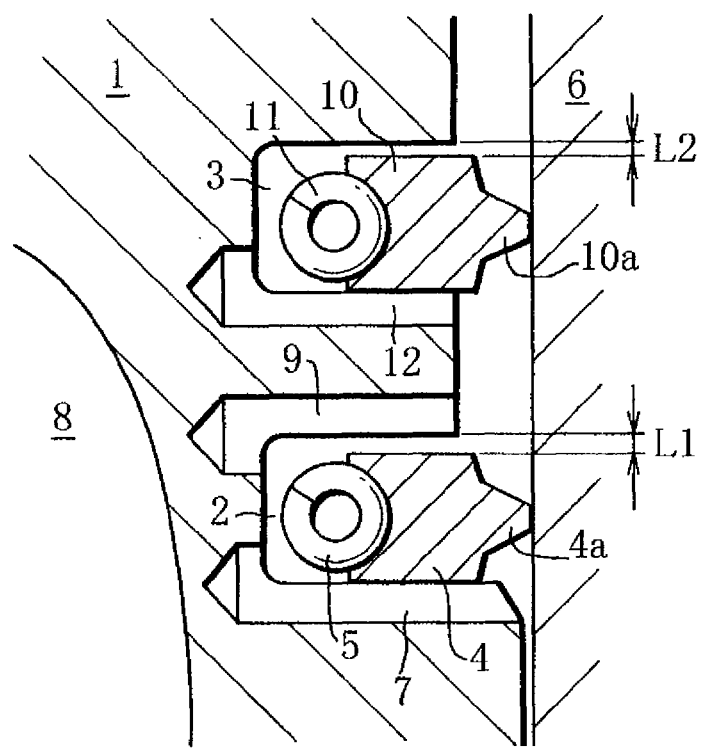
FIG. 6 is a longitudinal cross sectional view showing yet another embodiment of the present invention.

FIG. 6 is a drawing showing yet another embodiment of the present invention. In this embodiment, an axial clearance L1 between the upper surface of the lowermost ring groove 2 and the upper surface of the lowermost piston ring 4 within the lowermost ring groove 2, is larger than an axial clearance L2 between the upper surface of the ring groove 3 just above the lowermost ring groove 2 and the upper surface of the piston ring 10 within the ring groove 3 just above the lowermost ring groove 2. All other sections of the structure are identical to the above embodiment.

Utilizing the above described structure allows the piston ring 10 just above the lowermost piston ring 4 to seat more easily on the lower surface of the ring groove 3 while the piston 1 is lowered when the piston rings 4, 10 are moving up and down within the ring grooves 2, 3 due to the inertial force such as when operating the engine under no-load conditions. The upward leakage of oil on the piston land section between both the ring grooves 2, 3 can be therefore prevented, and oil can return to the crankcase by way of the oil path groove 9 formed on the upper surface of the lowermost ring groove 2, the space on the rear side of the lowermost piston ring 4, and the oil path groove 7 formed on the lower surface of the lowermost ring groove 2, so that oil consumption can be reduced even further.

Figure 7:
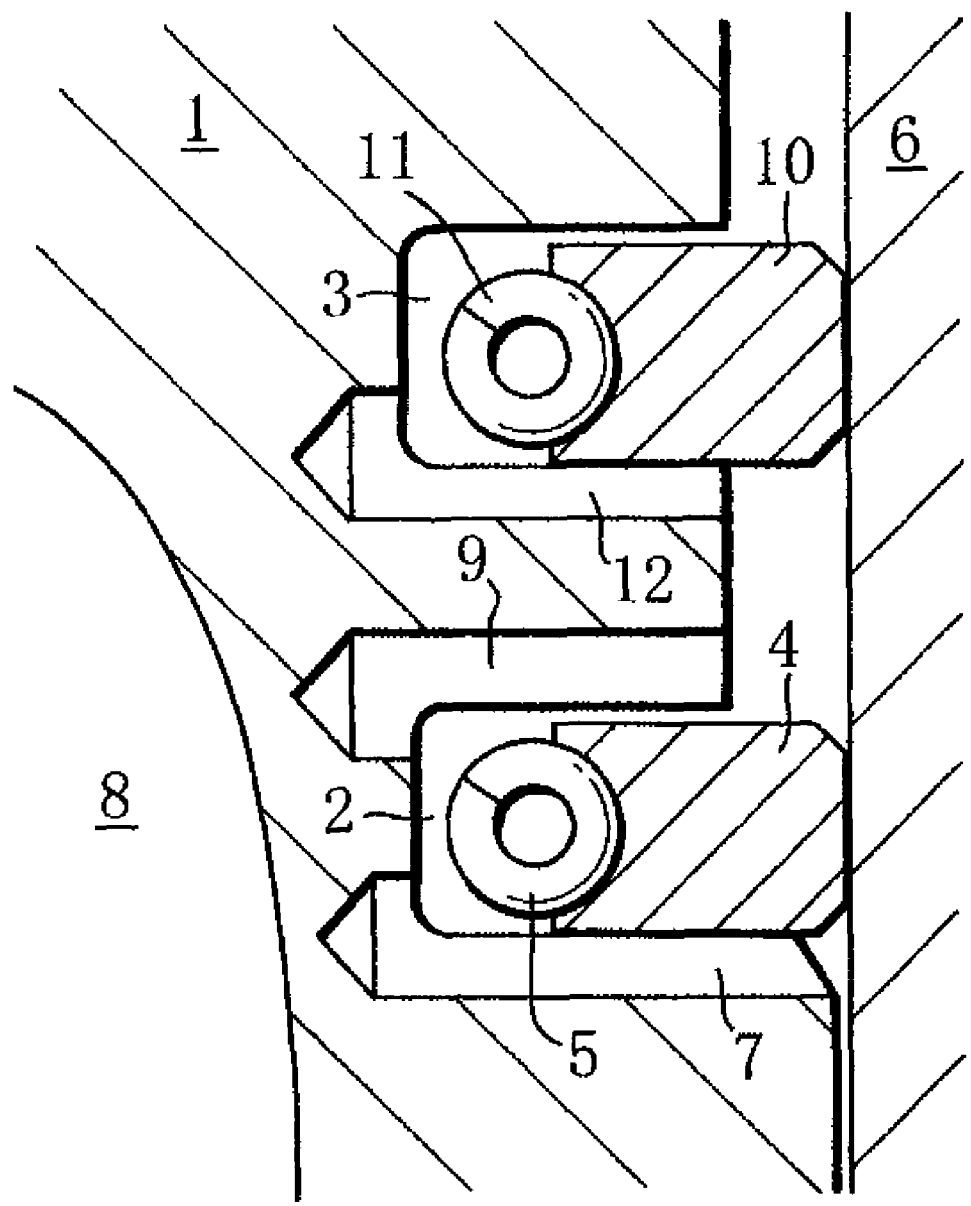
FIG. 7 is a longitudinal cross sectional view showing yet another embodiment of the present invention.

FIG. 7 is a drawing showing yet another embodiment of the present invention. In this embodiment, the lowermost piston ring 4 and the piston ring 10 just above the lowermost piston ring 4 are rings with rectangular cross sections containing no circular protrusions on the outer circumference. All other sections of the structure are identical to the above embodiment.

The tip surfaces of the piston rings 4, 10 that slide on the wall surface of the cylinder 6 are a flat surface in the above embodiments but is not limited to a flat surface and may be formed for example as a tapered surface.

The oil path groove 9 formed on the upper surface of the lowermost ring groove 2, the oil path groove 12 formed on the ring groove 3 just above the lowermost ring groove 2, as well as the oil path groove 14 to connect both the ring grooves 2, 3 and extending along the radial direction, preferably do not connect with the internal space 8 of the piston 1. The oil path groove 7 formed on the lower surface of the lowermost ring groove 2 can be selected as needed to connect or not to connect with the internal space 8 of the piston 1.

The above embodiments utilized a coil expander as the expander but the present invention is not limited to a coil expander, and for example, a plate spring containing multiple humps positioned at intervals along the periphery, an axial corrugated expander, or a radial corrugated expander may be used.

The invention claimed is:

1. A combination of a piston and a piston ring comprising; a piston including multiple ring grooves on an outer circumference of the piston, and piston rings mounted in the ring grooves, wherein the piston contains oil path grooves extending respectively to the outer circumference of the piston on upper and lower surfaces of the lowermost ring groove, and an oil path groove extending to the outer circumference of the piston on a lower surface of the ring groove just above the lowermost ring groove; the weight of the lowermost piston ring is equal to or smaller than the weight of the piston ring just above the lowermost piston ring; and an expander is installed on the rear side of each of the piston rings.

2. The combination of a piston and a piston ring as claimed in claim 1, wherein an axial oil path groove to connect the oil path grooves formed on both the ring grooves is formed on an outer circumference of a land section between the lowermost ring groove of the piston and the ring groove just above the lowermost ring groove.

3. The combination of a piston and a piston ring as claimed in claim 2, wherein the cross sectional area of the axial oil path groove is smaller on the ring groove side just above the lowermost ring groove than on the lowermost ring groove side.

4. The combination of a piston and a piston ring as claimed in claim 1, wherein the oil path groove formed on the upper surface of the lowermost ring groove, and the oil path groove formed on the lower surface of the ring groove just above the lowermost ring groove do not connect with an internal space of the piston.

5. The combination of a piston and a piston ring as claimed in claim 1, wherein the oil path groove formed on the lower surface of the lowermost ring groove does not connect with an internal space of the piston.

6. The combination of a piston and a piston ring as claimed in claim 1, wherein the oil path groove formed on the lower surface of the lowermost ring groove connects with an internal space of the piston.

7. The combination of a piston and a piston ring as claimed in claim 1, wherein an axial clearance between the upper surface of the lowermost ring groove and the upper surface of the lowermost piston ring within the lowermost ring groove is larger than an axial clearance between the upper surface of the ring groove just above the lowermost ring groove and the upper surface of the piston ring within the ring groove just above the lowermost ring groove.

8. The combination of a piston and a piston ring as claimed in claim 1, wherein the piston ring contains one circular protrusion across the entire outer circumference of the piston ring.

9. The combination of a piston and a piston ring as claimed in claim 1, wherein the surface of the outer circumference of the piston ring that slides on a cylinder is formed as a flat surface or a tapered surface.

10. The combination of a piston and a piston ring as claimed in claim 1, wherein gap positions of the lowermost piston ring and the piston ring just above the lowermost piston ring are shifted 90 degrees or more along the periphery and a structure for preventing both the rings from rotating is provided.

11. The combination of a piston and a piston ring as claimed in claim 1, wherein the expander is a plate spring containing multiple humps positioned at intervals along the periphery, an axial corrugated expander, a radial corrugated expander, or a coil expander.

12. A combination of a piston and a piston ring comprising; a piston including multiple ring grooves on an outer circumference of the piston, and piston rings mounted in the ring grooves, wherein the piston contains an oil path groove to connect both the ring grooves and extending to the outer circumference of the piston on a land section between the lowermost ring groove and the ring groove just above the lowermost ring groove, and an oil path groove extending to the outer circumference of the piston on a lower surface of the lowermost ring groove; the weight of the lowermost piston ring is equal to or smaller than the weight of the piston ring just above the lowermost piston ring; and an expander is installed on the rear side of each of the piston rings.

13. The combination of a piston and a piston ring as claimed in claim 12, wherein the oil path groove to connect both the ring grooves does not connect with an internal space of the piston.

14. The combination of a piston and a piston ring as claimed in claim 12, wherein the oil path groove formed on the lower surface of the lowermost ring groove does not connect with an internal space of the piston.

15. The combination of a piston and a piston ring as claimed in claim 12, wherein the oil path groove formed on the lower surface of the lowermost ring groove connects with an internal space of the piston.

16. The combination of a piston and a piston ring as claimed in claim 12, wherein an axial clearance between the upper surface of the lowermost ring groove and the upper surface of the lowermost piston ring within the lowermost ring groove is larger than an axial clearance between the upper surface of the ring groove just above the lowermost ring groove and the upper surface of the piston ring within the ring groove just above the lowermost ring groove.

17. The combination of a piston and a piston ring as claimed in claim 12, wherein the piston ring contains one circular protrusion across the entire outer circumference of the piston ring.

18. The combination of a piston and a piston ring as claimed in claim 12, wherein the surface of the outer circumference of the piston ring that slides on a cylinder is formed as a flat surface or a tapered surface.

19. The combination of a piston and a piston ring as claimed in claim 12, wherein gap positions of the lowermost piston ring and the piston ring just above the lowermost piston ring are shifted 90 degrees or more along the periphery and a structure for preventing both the rings from rotating is provided.

20. The combination of a piston and a piston ring as claimed in claim 12, wherein the expander is a plate spring containing multiple humps positioned at intervals along the periphery, an axial corrugated expander, a radial corrugated expander, or a coil expander.

* * * * *